Aug. 4, 1931.  J. G. COFFIN  1,817,293
MUSTARD DISPENSING DEVICE
Filed Nov. 30, 1928
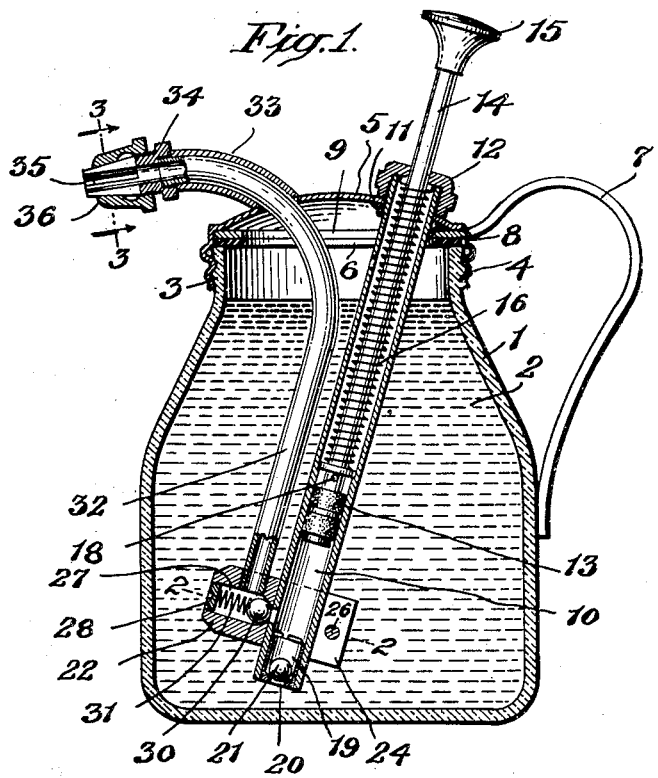
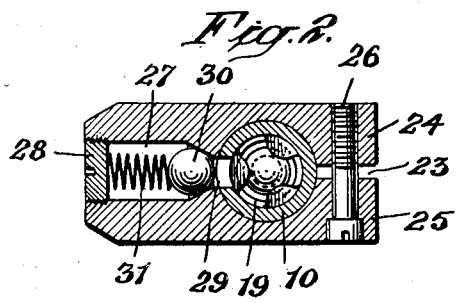
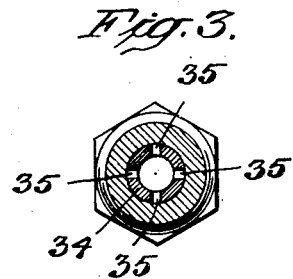
INVENTOR
Joseph G. Coffin
BY
Harry Radzinsky
his ATTORNEY Patented Aug. 4, 1931

1,817,293

UNITED STATES PATENT OFFICE

JOSEPH G. COFFIN, OF NEW YORK, N. Y., ASSIGNOR TO MUSTOMATIK SPECIALTIES, INC., OF NEW YORK, N. Y., A CORPORATION OF NEW YORK

MUSTARD DISPENSING DEVICE

Application filed November 30, 1928. Serial No. 322,732.

This invention relates to a table device used for dispensing mustard, mayonnaise and products of like viscosity and has for its object to provide an article of the character mentioned which shall be simple and positive in operation. It is well known that mustard and other similar food products, which, when the same are displayed in restaurants and on refreshment stands, are contained in an open vessel. This permits the air to act upon such substances, causing corrosion about the edge or mouth of the container, with the result that open containers of this character are more or less insanitary and unappetizing. In many cases, a stick or spoon is used for applying mustard to frankfurters or sandwiches and such a utensil usually, after a short amount of use, becomes encrusted and corroded with dry mustard.

Additionally, the dispensation of mustard from open containers sometimes results in spattering and splashing of the condiment, causing the clothing of customers to be stained thereby.

From the foregoing, it will be clear that there is need for a closed, sanitary dispensing device for mustard and the like, in which the mustard is dispensed in regulatable quantities, and in which the mustard is completely covered and kept clean and sanitary at all times. My invention meets the above requirements and at the same time, avoids any splashing or spattering of the dispensed condiments so that the use of this device is a pleasure.

My device is extremely compact and simple of structure and thus, unfailing in operation. It can be made cheaply, so that a number of these devices may be used in a restaurant or on a lunch counter without putting the owner of such establishment to any degree of expense for equipment of this kind.

With these objects and such other objects as may hereinafter appear, in view, I have devised the particular arrangement of parts hereinafter set forth and more particularly pointed out in the claims appended hereto.

Reference is to be had to the accompanying drawing, forming a part hereof, in which Figure 1 is a vertical sectional view of a mustard dispensing device made in accordance with my invention;

Figure 2 is a sectional view on the line 2—2 of Figure 1, looking in the direction of the arrows; and Figure 3 is a sectional view on the line 3—3 of Figure 1, looking in the direction of the arrows.

Throughout the various views of the drawings, similar reference characters designate similar parts.

In the embodiment of my invention disclosed in the accompanying drawings, 1 indicates the body of the vessel which may be made of glass, or of any non-corrosive substance. This vessel may be of any suitable shape and is used for containing mustard 2 or any similar preparation. The vessel 1 is provided with a threaded top 3 upon which is threaded a cap 4. This cap 4 may be made of sheet metal of such a nature that it is unaffected by the action of acetic acid usually contained in mustard. If desired, the cap may be made of bakelite.

The top plate 5 of the cap is preferably dome shaped, as shown. A suitable gasket or washer 6 acts to secure a tight joint between the cap 4 and the vessel 1. At 7 is shown a handle which projects out of a slot 8 provided in the cap 4. The inner end of said handle 7 is provided with an annulus 9 that fits within the cap 4 and lies between the dome shaped top plate 5 of said cap and the upper surface of the gasket 6.

From the foregoing description, it will be apparent that the handle forms a part of the cap 4 and is detachable from the vessel therewith. At 10 is shown a tubular member or piston chamber which extends diagonally through the vessel 1 and projects out of the dome shaped plate 5 of the cap. This tube 10 is secured to the cap by means of an inner nut 11 and a dome shaped outer nut 12.

At 13 is shown a piston which is capable of reciprocation in the tube 10, this piston being connected to a plunger rod 14 which has its upper end projecting for a considerable distance above the top plate 5 of the cap. The upper end of the piston stem 14 is provided with a head 15 which is adapted to be pressed downwardly by the thumb against the tension of a spring 16 which bears against a washer 17 provided on the rod 14. This washer 17 is prevented from downward movement by a cross pin 18 below it which passes through the rod 14.

From the foregoing, it will be seen that the piston may be reciprocated within the tube 10 by pressure of the thumb on the knob 15 and when the thumb is released, the spring acts to elevate the piston. The lower end of the tube 10 is closed with a plug 19 which has an opening 20 in its lower end. The plug 19 is tubular and contains a ball 21 which normally acts to close the inlet opening 20. At 22 is a cross member which has one of its ends split as at 23. This cross member embraces the tube 10 and is clamped about the same by drawing together the sides 24 and 25 located on opposite sides of the split 23. This is effected by means of a screw 26.

The cross member 22 is provided with a bore 27 having its outer end closed by a threaded plug 28. At the inner end of the bore 27 is located a valve seat 29 which receives a ball-valve 30 that is held on said seat by means of a coil spring 31.

At 32 is shown a feed pipe which is threaded into the cross-member 22 so that its lower end extends into and connects with the bore 27. This feed pipe 32 extends upwardly for some distance parallel with the tube 10 and then curves outwardly through the top plate 5 of the cap 4 to form a dispensing spout. The portion of the pipe 32 which extends out beyond the top plate 5 of the cap 4 is surrounded by a tubular cover member 33 which is maintained in place by a slotted tip 34 that is threaded on the extreme end of the pipe 32. This tip 34 is provided with a number of spaced slots 35 and a contracting nut 36 is threaded on the exterior of the tip 34.

It will be apparent that by threading the nut 36 in one direction or the other, the slots 35 may be opened or closed to increase or decrease the effective opening or bore of the tip 34. Through this arrangement, the amount of mustard that can be passed through the tip at one time is regulatable.

From the foregoing, the manner in which my improved device operates will be readily understood. Assuming that the thumb has just pressed the plunger 13 downwardly and has ejected a quantity of mustard. The thumb then releases its pressure on the knob 15 and the piston is forced upwardly under the impulse of the spring 16. This action of said piston draws the ball 21 from its seat, causing it to uncover the inlet opening 20 and mustard is drawn within the lower end of the tube 10. When the piston is forced downward by pressure on the top 15, the pressure of the mustard in the lower end of the tube 10 forces the ball 21 on its seat over the opening 20 and the compressed mustard then seeking an exit, forces the ball 30 from its seat 29 so that said mustard enters the bore 27 and passes therefrom out through the pipe 32 to finally emerge out of the tip or spout 34.

I have described this structure for use in conjunction with a small table dispensing device, especially adapted for use in connection with mustard. It will be obvious that it may be made in various forms and used for the dispensation of other kinds of material, without departing from the spirit of my invention.

What I claim is:—

1. A device of the class described comprising a vessel, a feed pipe located within said vessel and having a bent portion extending out of the same to form a dispensing spout, a split end on said spout and means for contracting said split end to regulate the flow from said spout.

2. A device of the class described comprising a vessel for containing mustard, a cover therefor, a handle located externally of the vessel and provided with an annulus located and clamped between the cover and the top of the vessel, piston means operative within the vessel for dispensing the contents thereof, said piston means extending through the cover and through the annulus and passing diagonally within the vessel and provided with a manipulating plunger extending out of the cover member at a point adjacent to the external portion of the handle.

Signed at the city, county and State of New York, this 26th day of November, 1928.

JOSEPH G. COFFIN.